US 6,741,703 B1

(12) United States Patent
Clour

(10) Patent No.: US 6,741,703 B1
(45) Date of Patent: May 25, 2004

(54) MECHANICAL HANDSET LIFT FOR A TELEPHONE

(76) Inventor: Charles M. Clour, 120 7th Ave. North, Sauk Rapids, MN (US) 56379

( * ) Notice: Subject to any disclaimer, the term of this patent is extended or adjusted under 35 U.S.C. 154(b) by 271 days.

(21) Appl. No.: 09/717,975

(22) Filed: Nov. 14, 2000

Related U.S. Application Data

(63) Continuation-in-part of application No. 08/770,599, filed on Dec. 19, 1996, now abandoned, which is a continuation-in-part of application No. 08/484,070, filed on Jun. 7, 1995, now abandoned, which is a continuation of application No. 07/914,540, filed on Jul. 17, 1992, now abandoned, which is a continuation-in-part of application No. 07/667,286, filed on Mar. 11, 1991, now abandoned.

(51) Int. Cl.$^7$ .................................................. H04M 1/00
(52) U.S. Cl. ........................ 379/447; 379/454; 379/448
(58) Field of Search ................................. 379/446, 447, 379/448, 454, 455, 449

(56) References Cited

U.S. PATENT DOCUMENTS

| 2,212,791 | A | * | 8/1940 | Reading | 379/447 |
| 2,473,106 | A | * | 6/1949 | Mathieson | 379/447 |
| 2,552,590 | A | * | 5/1951 | Ross | 379/448 |
| 2,602,863 | A | * | 7/1952 | Raymond et al. | 379/454 |
| 2,845,496 | A | * | 7/1958 | Limata | 379/447 |
| 2,961,498 | A | * | 11/1960 | Snow | 379/447 |
| 2,997,544 | A | * | 8/1961 | Ando | 379/449 |
| 4,392,017 | A | * | 7/1983 | Torres | 379/447 |
| 5,758,289 | A | * | 5/1998 | Lipp et al. | 379/448 |

* cited by examiner

Primary Examiner—Jack Chiang
(74) Attorney, Agent, or Firm—Hugh D. Jaeger

(57) ABSTRACT

Mechanical handset lift for raising of one end of a telephone receiving handset to activate the hook switch and allow the handset to remain positioned over a telephone body so that electrical operation of a remote receiver/mouthpiece can be effected.

20 Claims, 24 Drawing Sheets

MECHANICAL HANDSET LIFT FOR A TELEPHONE

CROSS REFERENCES TO CO-PENDING APPLICATIONS

This patent application is continuation-in-part of Ser. No. 08/770,599 entitled "Remote Telephone Answering System" filed Dec. 19, 1996, abandoned, which is a continuation-in-part of Ser. No. 08/484,070 entitled "Mechanical Handset Lift for a Telephone" filed on Jun. 7, 1995, abandoned, which is a continuation of Ser. No. 07/914,540 entitled "Mechanical Handset Lift for a Telephone" filed on Jul. 17, 1992, abandoned, which is a continuation-in-part of Ser. No. 07/667,286 entitled "Mechanical Handset Lift for a Telephone" filed on Mar. 11, 1991, abandoned, all by the same inventor.

BACKGROUND OF THE INVENTION

1. Field of the Invention

The invention relates generally to a device that attaches to a telephone for the purpose of lifting up the receiver end of a telephone handset (hook-switching).

2. Description of the Prior Art

Many of the newest telephone systems that are coming out on the market have what is called electronic hook-switching. This is basically a button, that when pressed, will give a dial tone for a telephone headset. This is a very convenient option for people who use telephone headsets, but the problem still remains that there are literally millions of telephones on the market that do not have this option.

Until now, the only option that people have had to alleviate this problem is to physically pick up the handset every time the telephone rings, and place the headset off to the side of the telephone base. This procedure is time and space consuming.

Another method that is commonly used when getting a dial tone, is to balance the telephone handset just up and to the side of the telephone's hook-switch. The major problem with this solution is that if accidently bumped or moved, the handset will fall back into place and one will hang up the line.

The present invention overcomes the prior art practices by providing a mechanical handset lift for lifting the receiver end of a telephone handset off the hook-switch and pivoting the handset about the microphone end, but leaving the handset centrally positioned over and about the telephone body.

SUMMARY OF THE INVENTION

The general purpose of the present invention is to provide a mechanical device for lifting the receiver end of a telephone handset off the telephone hook-switch to allow electrical operation of a remote handset receiver/mouthpiece while still leaving the handset placed over and about the telephone base unit.

According to one object of the present invention, there is provided a vertically oriented base for mounting to the side of a telephone base. A moveable pivot shaft extends through an upper region of the vertically oriented base end, which includes a lift rod secured to one end of the pivot shaft and a lift rod lever handle secured to the opposite end of the pivot shaft. A stop shaft limits the over center travel of the lift rod lever handle and the lift rod to allow on hook or off hook positioning of a telephone handset receiver.

According to an alternate embodiment of the present invention, there is provided a vertical base member with a lift rod and lift lever secured about the base member in positive locked alignment and also having rotational stops aligned on a surface of the vertical base member.

One significant aspect and feature of the present invention is mechanical handset lift that will mechanically lift up the receiver end of a telephone handset off the hook-switch so that a dial tone may be obtained for the telephone headset in use.

Another significant aspect and feature of the present invention is a mechanical handset lift which will lift the receiver end of a telephone handset off the hook-switch so as to allow a user to use either the telephone handset or a telephone headset.

A further significant aspect and feature of the present invention is a mechanical handset lift which will lift the receiver end of a telephone handset off the hook-switch and which will result in the environment on a person's desk being less cluttered due to the absence of a telephone handset lying off to the side of the telephone base while the telephone handset is in use.

Yet another significant aspect and feature of the present invention is a mechanical handset lift that will mechanically lift up the receiver end of a telephone handset in such a manner that will greatly increase the chances of not accidentally hanging up the telephone while a telephone headset is in use.

Another significant aspect and feature of the present invention is a lift rod and lift rod handle in positive angular engagement with each other about a base unit.

Another significant aspect and feature of the present invention is stops which define rotational movement of the lift rod and lift rod handle with respect to the base of a telephone.

Having thus described the embodiments of the present invention, it is the principal object hereof to provide a mechanical handset lift.

The present invention relates to a mechanical handset lift device that will enable the telephone user to enable and disable the telephone's hook-switch capabilities without the inconvenience of picking up the telephone and placing it on the desk. Currently, the only means to do this is by placing the telephone handset on and off the hook-switch. The problems that arrive from this method are 1) one has to physically pick up the handset every time the telephone rings, 2) one has to lay the handset on the desk (for many people this takes up just too much room), 3) if the telephone allows one to balance the handset off to the right side of the hook switch, one may bump the telephone, and accidentally hang up.

The invention uses the handset's own mold to accomplish the goal of hook-switching, and allows the handset to be used as well. The present invention also creates an environment where it is virtually impossible to accidently hand up the telephone. This is a very common problem when the telephone is balanced to the side of the hook-switch.

It is an object of the present invention to provide a device that will enable a telephone handset operator to use both the telephone handset or headset conveniently, without the problems that are currently plaguing the telephone headset industry.

BRIEF DESCRIPTION OF THE DRAWINGS

Other object of the present invention and many of the attendant advantages of the present invention will be readily appreciated as the same becomes better understood by reference to the following detailed description when considered in connection with the accompanying drawings, in which like reference numerals designate like parts throughout the figures thereof and wherein.

DESCRIPTION OF THE PREFERRED EMBODIMENTS

Figure 1:
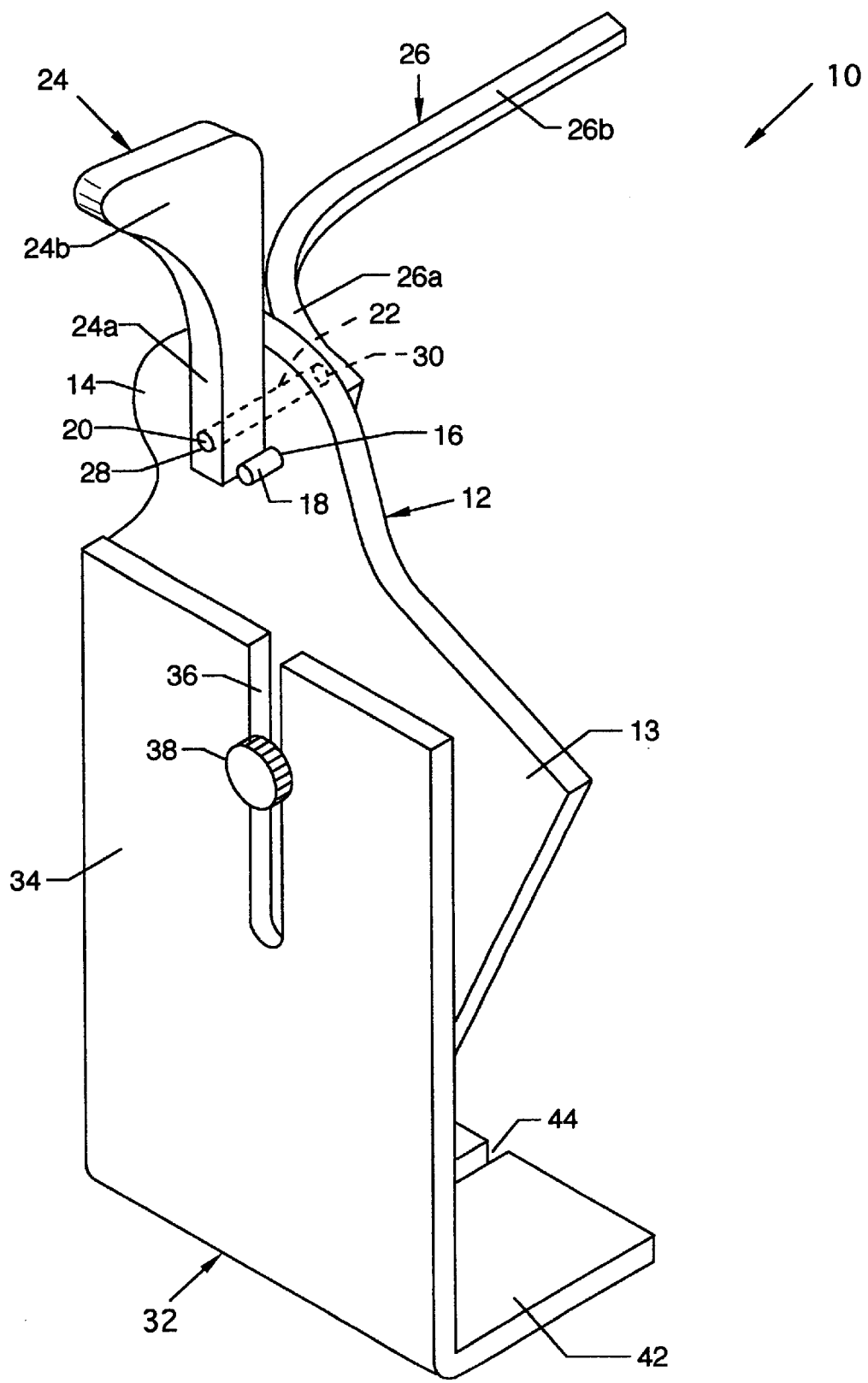
FIG. 1 illustrates a perspective view of the mechanical handset lift, the present invention.

FIG. 1, a typical embodiment of the mechanical handset lift 10 is illustrated in perspective. The mechanical handset lift 10 has a durable vertically oriented planar base member 12 consisting of a durable material which can be either cut or injection molded. In the preferred embodiment, the unit is a durable plastic, such as acrylic. However, the unit can consist of any other material that can be durable enough to obtain the required strength in order for the unit to perform optimally.

Figure 6:
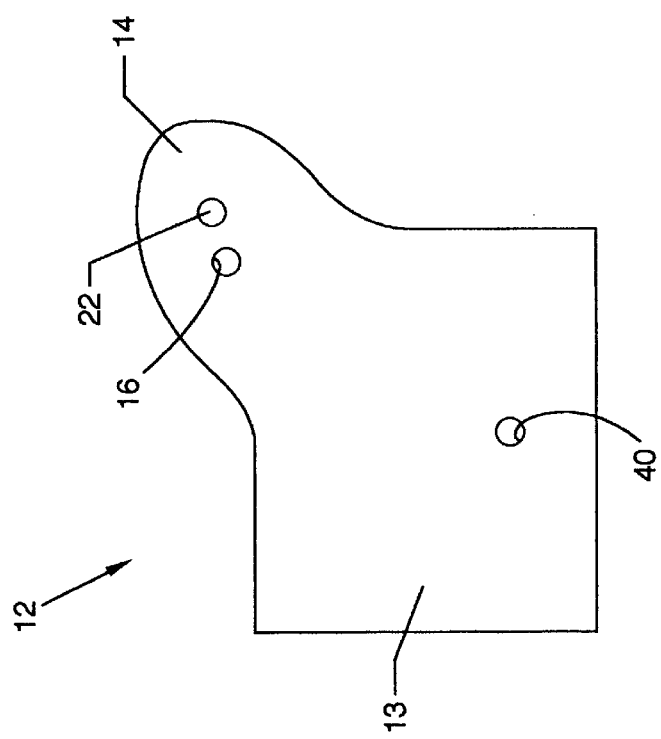
FIG. 6 illustrates a side view of the vertically oriented base member.

The base member 12 of the mechanical handset lift 10 is the core unit which the other components revolve around. A rounded ear shaped extension member 14 extends from the essentially square shaped base member 12. A hole 16 in the base member 12 that is farthest to the right at the top is where a stationary stop shaft 18 is frictionally engaged. A pivotal shaft 20 extends through a hole 22 in the extension member 14 to connect and secure both a lift rod lever 24 and a lift rod 26 together. The lift rod 26 is L-shaped and includes a hole 30 in the shorter of the angled members. The pivotal shaft 20 is smaller than the 5.08 mm hole 22. One end of the pivotal shaft 20 frictionally engages a hole 28 in the bottom portion of the lift rod lever 24, passes through the hole 22 in the extension member 14 and then frictionally engages a hole 30 in one end of the lift rod 26. The hole 16 just to the right of hole 22 is created to be filled by stationary stop shaft 18 that is the same size as the 5.08 mm hole 16. The stationary stop shaft 18 is press fit into the hole 16. An angled mounting bracket 32 is provided for attachment of the base member 12 and its associated members to the base of a telephone. The vertical portion 34 of the angled mounting bracket 32 includes a slot 36 for adjustable sliding accommodation of a mechanical screw 38. The mechanical screw 38 aligns in a hole 40 in the base member 12 as illustrated in FIG. 6. The horizontal portion 42 of the angled mounting bracket 32 includes a slot 44 for securement to the underside of a telephone base member.

In the alternative VELCRO strips can be used to attach just the base member 12 and associated members to the telephone base member if the use of the angled bracket is not desired. Use of VELCRO strips are illustrated in FIGS. 2 and 3.

Figure 15:
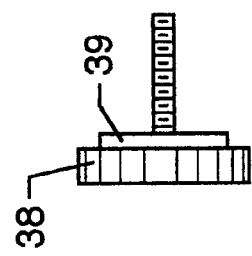
FIG. 15 illustrates a side view of the screw and washer.

The base unit of the mechanical handset lift is sometimes not supported enough with the use of VELCRO against the telephone on its own. In this case, the angled mounting bracket 32 will be used. This angled mounting bracket 32 attaches to the telephone base unit with the use of the adjustment nut and washer, such as illustrated in FIG. 15. By placing the angled mounting bracket 32 next to the base unit, and placing the horizontal portion 42 of the angled mounting bracket 32 under the telephone base, one can increase its stability tremendously. This stabilizes the angled mounting bracket and adds support.

Figure 2:
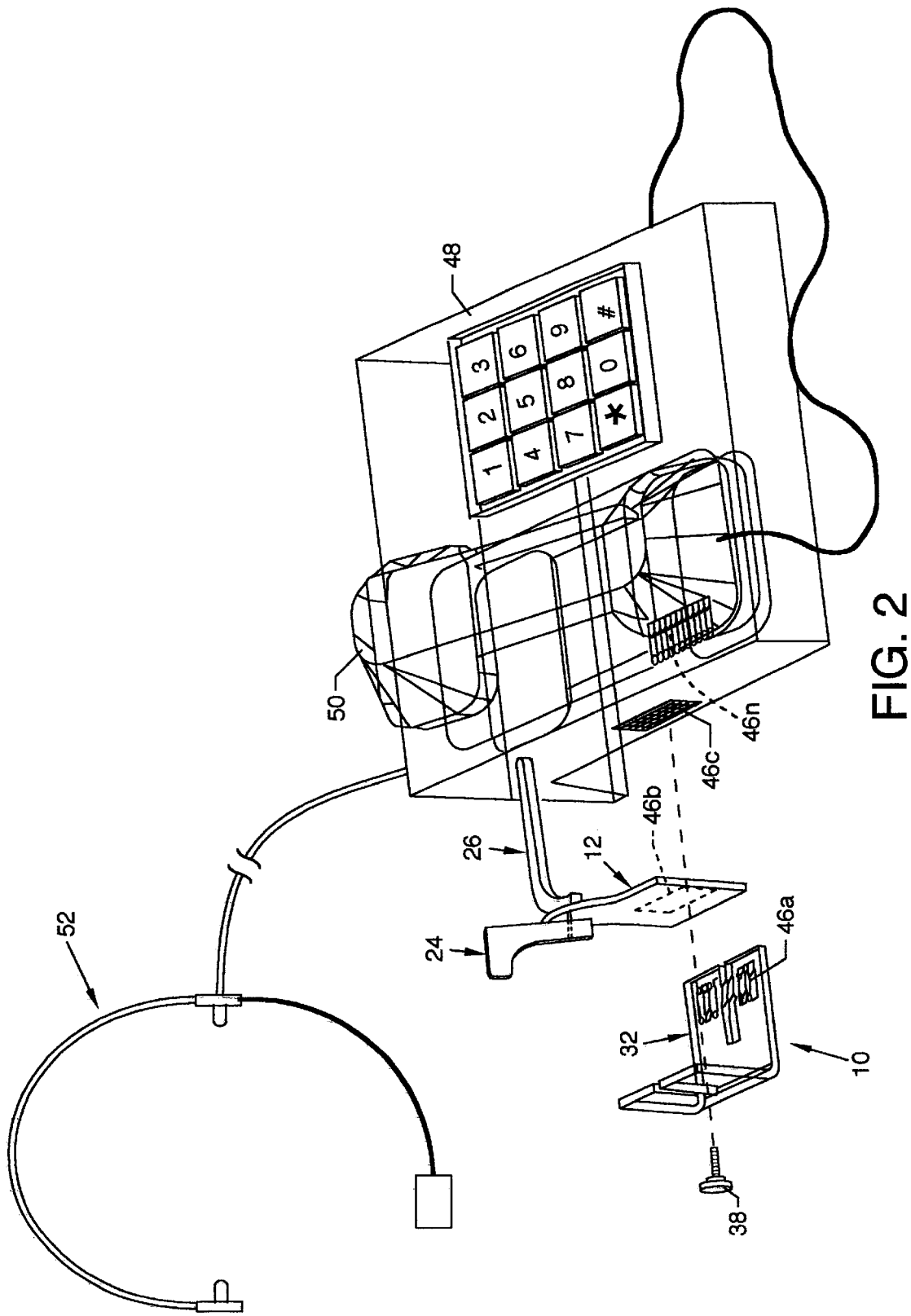
FIG. 2 illustrates a partially exploded perspective view of the mechanical handset lift in use with a telephone base, a handset, and a remote headset/boom mike.
Figure 3:
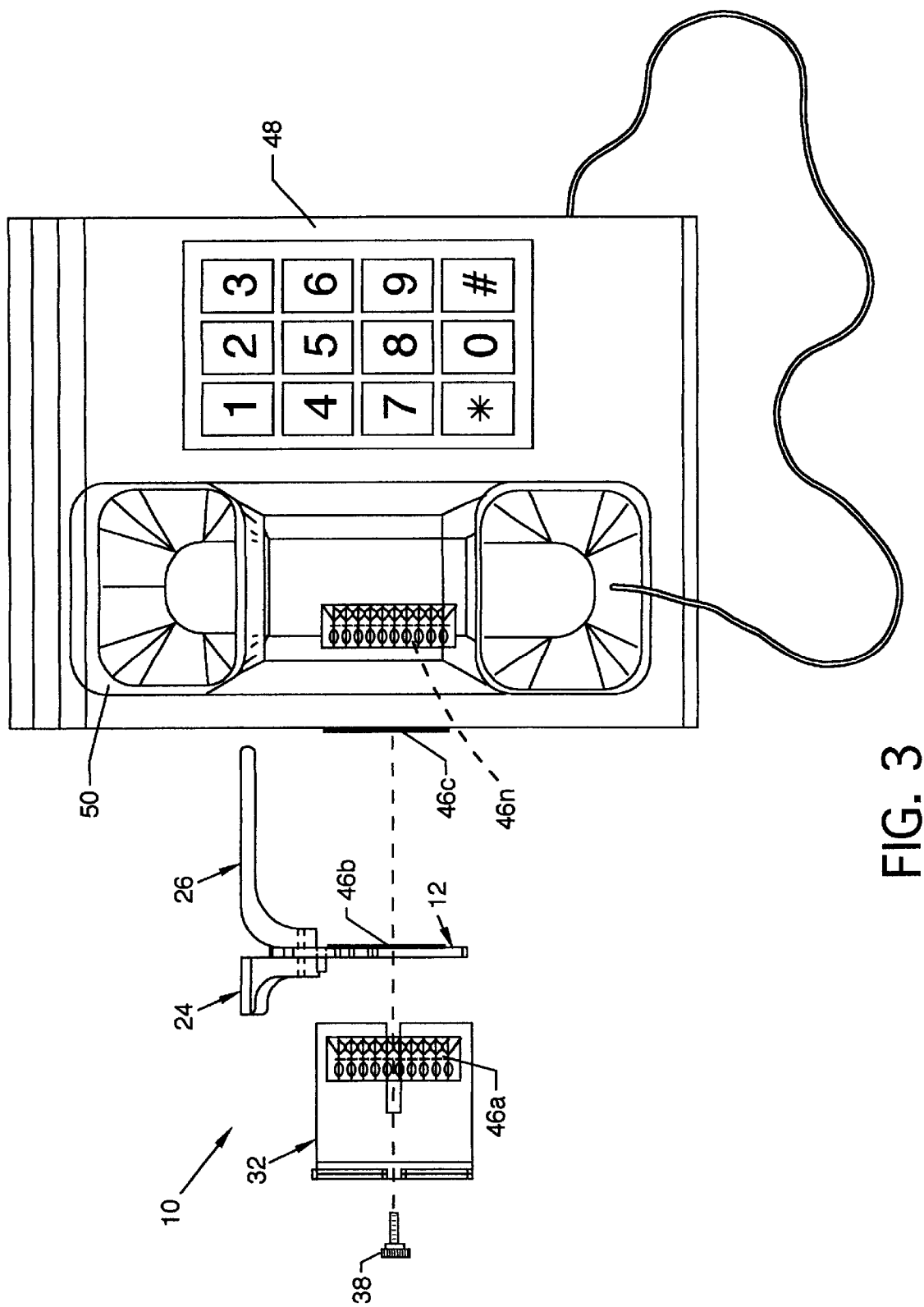
FIG. 3 illustrates a partially exploded top view of the mechanical lift in use with a telephone base and a headset.
Figure 4:
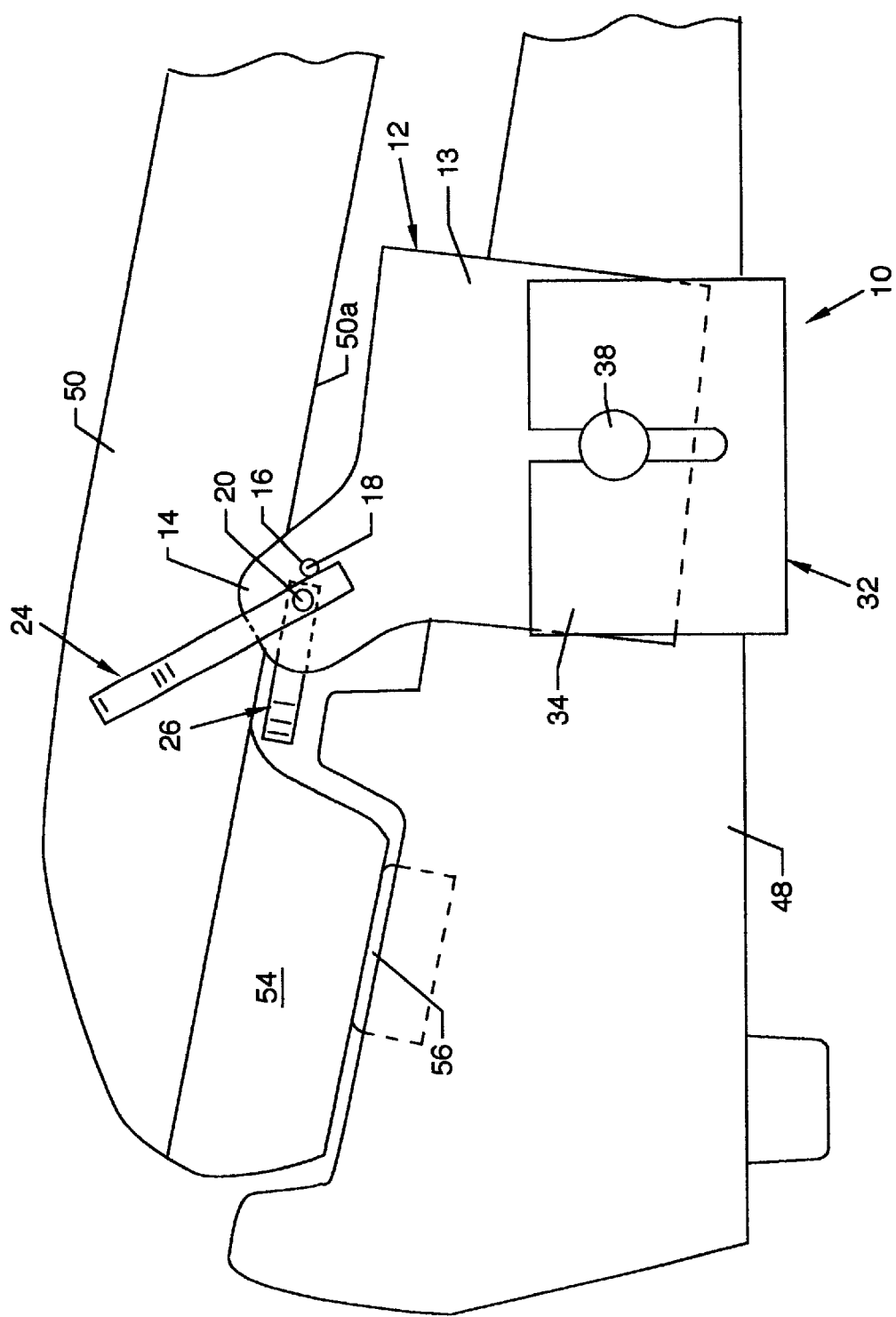
FIG. 4 illustrates a left side view of the mechanical headset lift in the static position.
Figure 5:
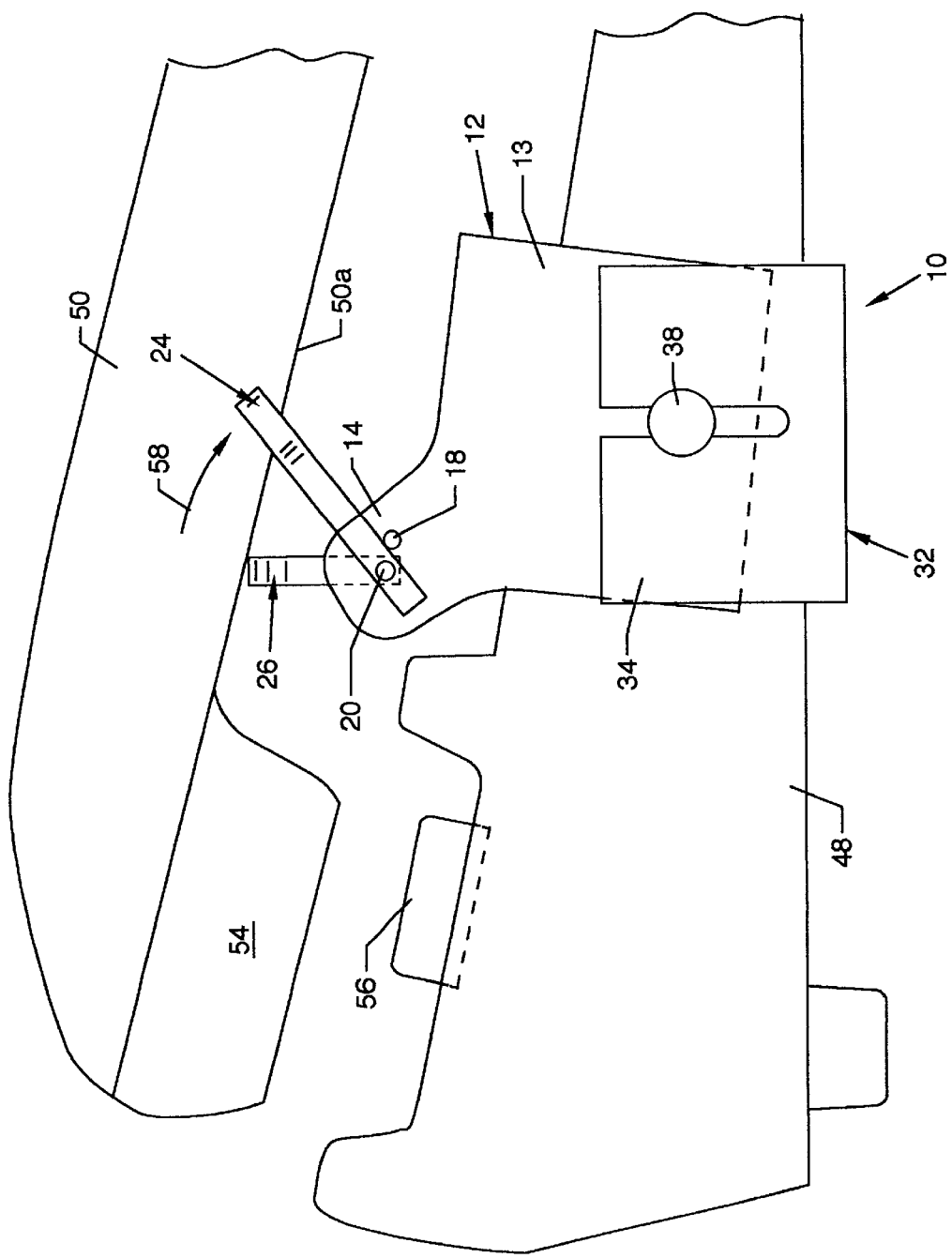
FIG. 5 illustrates a left side view of the mechanical headset lift in the operational position.

Additional embodiments are shown in FIGS. 2 and 3. In each case, the mechanical handset lift is not connected to the telephone. Illustrated in particular is the alignment of VELCRO strips 46a–46n for positioning of the base 12 on the telephone base 48. FIGS. 4 and 5 show how the handset 50 will be raised off the telephone switch 52, thereby allowing a dial tone for the telephone headset. In FIG. 4, the lift rod 26 is shown aligned to the telephone handset 50. The lift rod 26 is flush to the receiver portion of the telephone handset 50.

FIG. 2 illustrates a partially exploded perspective view of the mechanical handset lift 10 in use with a telephone base 48, a handset 50, and a connected remote headset/boom mike 52.

FIG. 3 illustrates a partially exploded top view of the mechanical lift 10 in use with a telephone base 48 and handset 50 where all numerals correspond to those elements previously described. The remote headset/boom mike 52 is not illustrated for purposes of brevity and clarity.

FIG. 4 illustrates a left side view of the mechanical handset lift 10 in the static position where the lift rod 26 allows the handset receiver 54 to depress the hook switch 56 of the telephone base 48 where all numerals correspond to those elements previously described. The lift rod 26 rests just adjacent to or touching the bottom surface 50a of the handset 50 in order to allow the weight of the handset 50 to depress the hook switch 56.

FIG. 5 illustrates the mechanical handset lift 10 in the operational mode where all numerals correspond to those elements previously described. The lift rod lever 24 is actuated in the direction of arrow 58 to cause the lift rod 26 to assume the actuated vertical position, thereby contacting the surface 50a to lift the handset receiver 54 and allowing the hook-switch 56 to assume the off hook position. This allows the parallel wired headset/boom mike 52 of FIG. 2 to be utilized without removal of the handset 50 from the cradle as the telephone is now on line with respect to the hook switch 56. As also illustrated in FIGS. 4 and 5, the stationary stop shaft 18 limits the movement of the lift rod lever 24, and thus the lift rod 26, both predetermined over the center positions.

FIG. 6 illustrates a side view of the vertically oriented base member 12 where all numerals correspond to those elements previously described.

Figure 7:
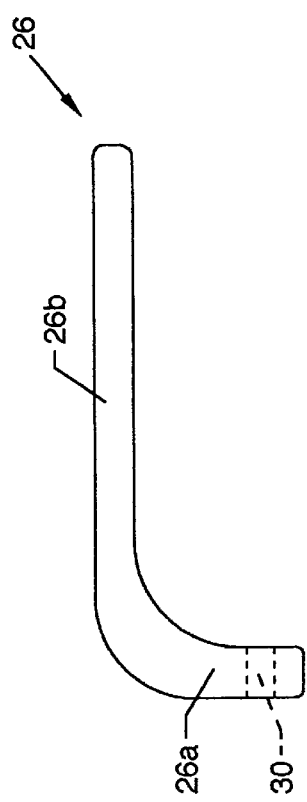
FIG. 7 illustrates a side view of the lift rod.

FIG. 7 illustrates a side view of the lift rod 26 where all numerals correspond to those elements previously described.

Figure 8:
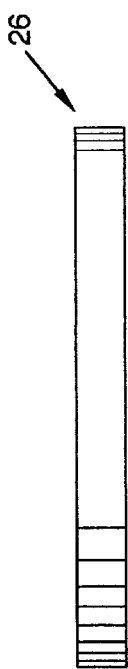
FIG. 8 illustrates a top view of the left rod.

FIG. 8 illustrates a top view of the lift rod 26 where all numerals correspond to those elements previously described.

Figure 9:
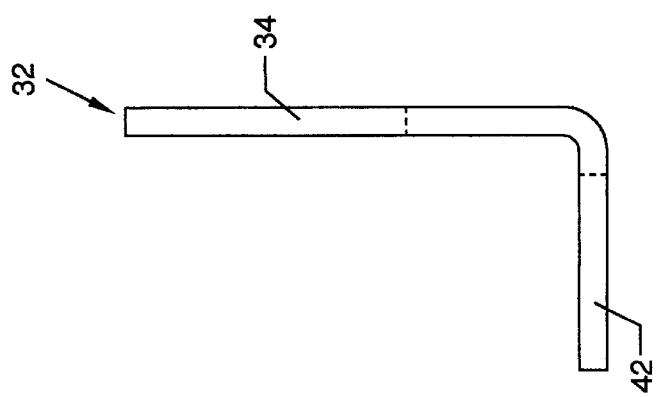
FIG. 9 illustrates a side view of an angled bracket.

FIG. 9 illustrates a side view of the angled mounting bracket 32 in a vertical orientation where all numerals correspond to those elements previously described.

Figure 10:
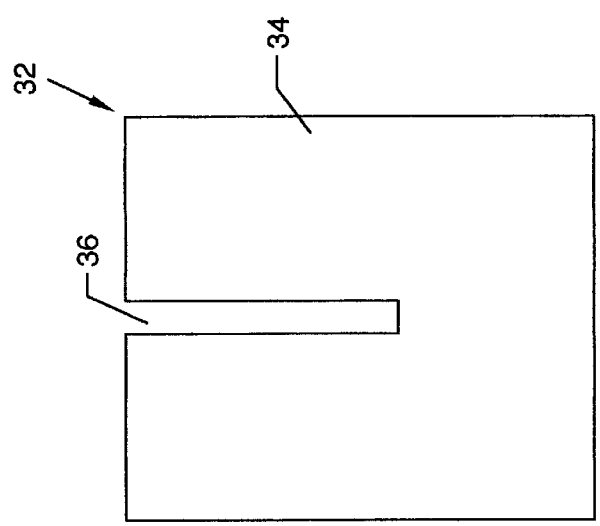
FIG. 10 illustrates a back view of the vertical portion of the angled bracket.

FIG. 10 illustrates a back view of the vertical portion 34 of angled mounting bracket 32 of FIG. 9 where all numerals correspond to those elements previously described.

Figure 11:
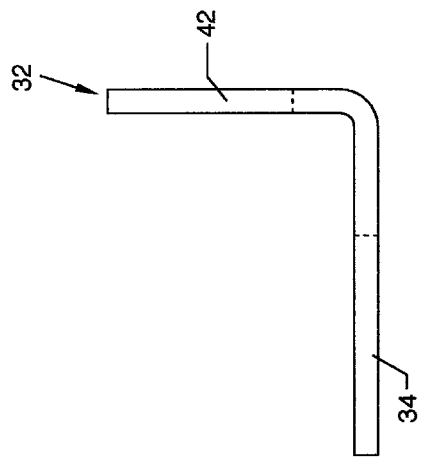
FIG. 11 illustrates a side view of the vertical portion of the angled bracket.

FIG. 11 illustrates a back view of the vertical portion 34 of angled mounting bracket 32 of FIG. 9 where all numerals correspond to those elements previously described.

Figure 12:
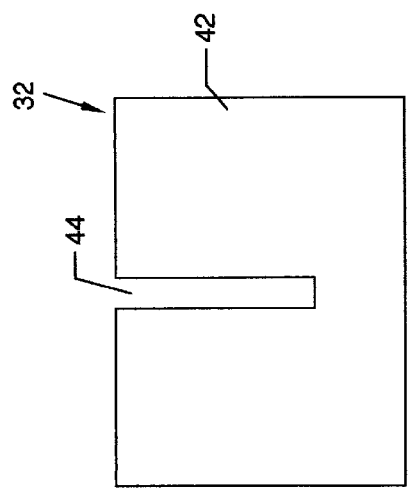
FIG. 12 illustrates a back view of the horizontal portion of the angled bracket.

FIG. 12 illustrates a back view of the horizontal portion 42 of the angled mounting bracket 32 of FIG. 11 where all numerals correspond to those elements previously described.

Figure 13:
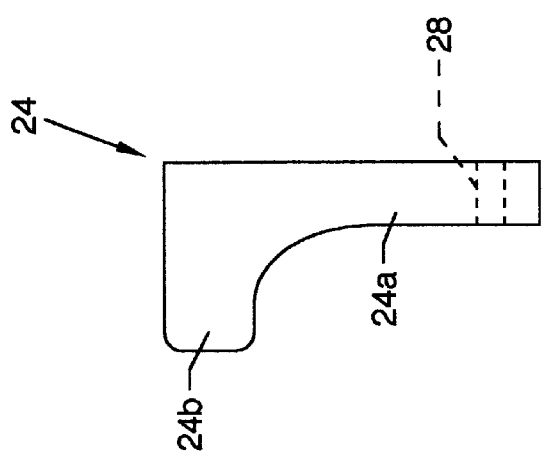
FIG. 13 illustrates a front view of the lift rod lever handle.

FIG. 13 illustrates a front view of the lift rod lever 24 where all numerals correspond to those elements previously described.

Figure 14:
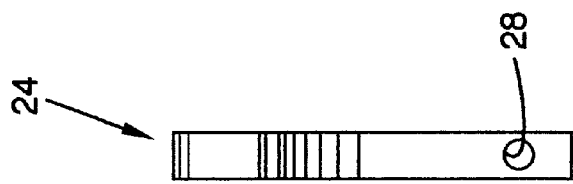
FIG. 14 illustrates a side view of the lift rod lever handle.

FIG. 14 illustrates a side view of the lift rod lever 24 where all numerals correspond to those elements previously described.

FIG. 15 illustrates a side view of the mechanical screw 38 and a washer 39 where all numerals correspond to those elements previously described.

Figure 16:
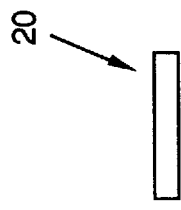
FIG. 16 illustrates a side view of the pivot shaft.

FIG. 16 illustrates a side view of the pivotal shaft 20 where all numerals correspond to those elements previously described.

MODE OF OPERATION

The manner of using the mechanical handset lift 10 is as follows. One first aligns the base member 12 next to the telephone so that the lift rod 26 is flush next to the listening portion of the handset 50 as shown in FIG. 4. Next, press the base member 12 unit against the telephone base 48 so that when the lift rod 26 is in its raised position, one will obtain a dial tone, see FIG. 8, for example. Next, if one is satisfied with the operation of the mechanical handset lift 10, attach the male portion of the gripping aperture to the telephone and fasten the female portion, which is on the base unit of the gripping aperture, against it until needed strength is obtained. Next, if additional strength is needed, align the angled mounting bracket 32 next to the base unit and fasten them together with the adjustment nut and washer. If stability is still required, place an additional gripping aperture to the bottom of the telephone to connect both the telephone and the angled mounting bracket 32 to one another.

DESCRIPTION OF AN ALTERNATIVE EMBODIMENT

Figure 17:
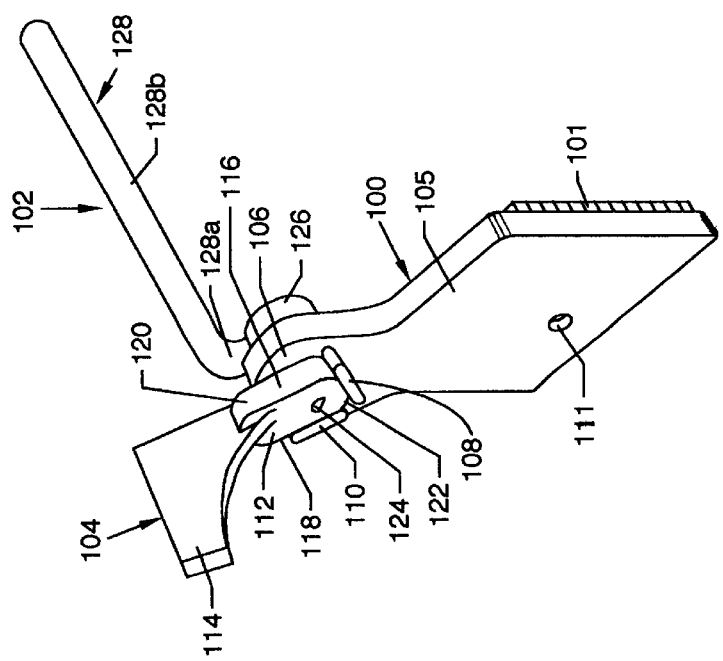
FIG. 17, an alternative embodiment, illustrates a perspective view of a vertically oriented base member having a lift rod and lift rod lever rotatingly secured thereto.

FIG. 17, an alternative embodiment, illustrates a perspective view of a vertically oriented planar base member 100 for use with the angled mounting bracket 32 of FIG. 2 including a lift rod 102 and a connected lift rod lever 104. The above members are of a durable plastic, such as acrylic, and can be either cut or injection molded.

the base member 100 is the core unit which the other components revolve about, and includes a VELCRO strip 101, incorporated as previously described. A rounded ear shaped extension member 106 extends from the essentially square shaped base member 100. An integral pivotal shaft, as illustrated in the following figures, extends from the lift rod 102 through a hole in the base member 100 to frictionally engage the lift rod lever 104 as described later in detail to pivotally secure the lift rod 102 and the lift rod lever 104 to the base member. Integral stop members 108 and 110 extend outwardly from one planar surface of the base member 100. A mounting hole 111 is also included through the base member 100. The lift rod lever 104 includes a base member 112 having rounded ends and a configured actuation tab 114 perpendicular to and extending from the base member 112. The base member 112 includes opposing planar surfaces 116 and 118 between the rounded ends 120 and 122. A semicircular hole 124 aligns in one end of the base member 112.

The lift rod 102 includes a round base member 126 and a rounded shaft member 128 extending at a right angle therefrom. Also included is a pivotal shaft as illustrated in detail in the following figures.

Figure 18:
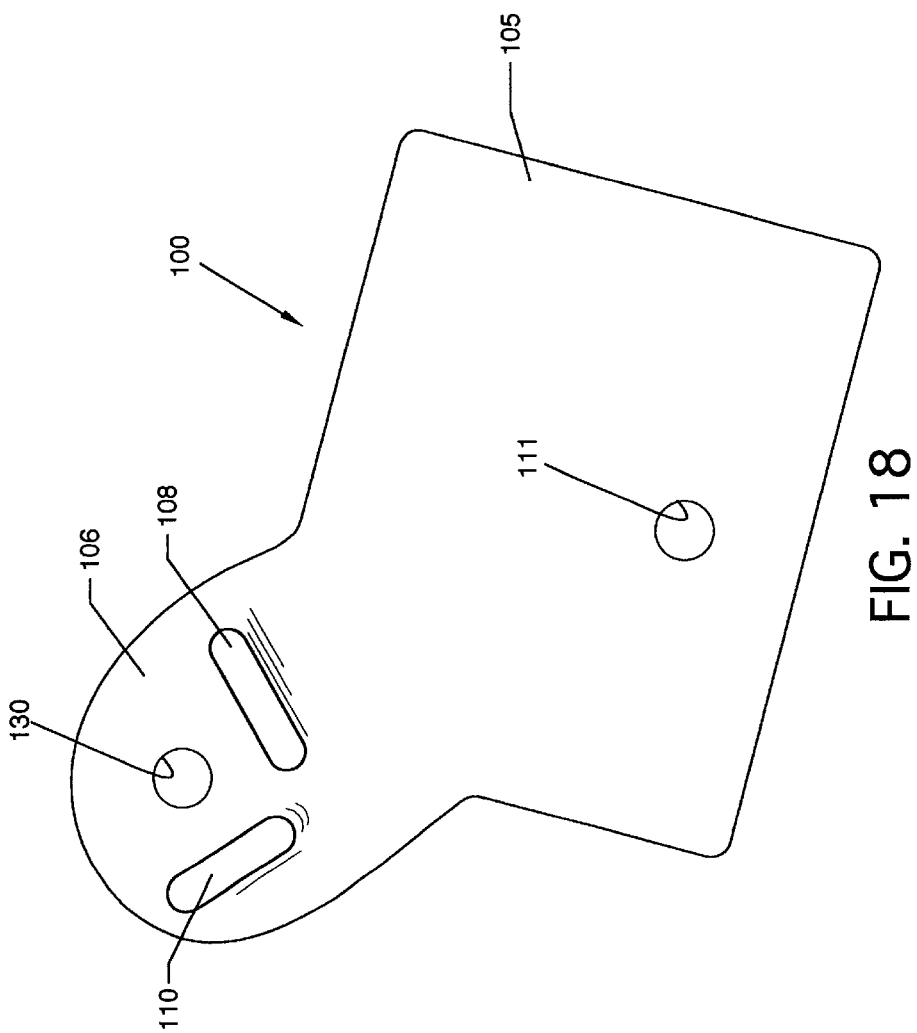
FIG. 18 illustrates a side view of the vertically oriented base member.

FIG. 18 illustrates a side view of the base member 100 where all numerals correspond to those elements previously described. Illustrated in particular are the stopping members 108 and 110, each aligned at a similar distance from and perpendicular to a pivotal mounting hole 130 in the extension member 106.

Figure 19:
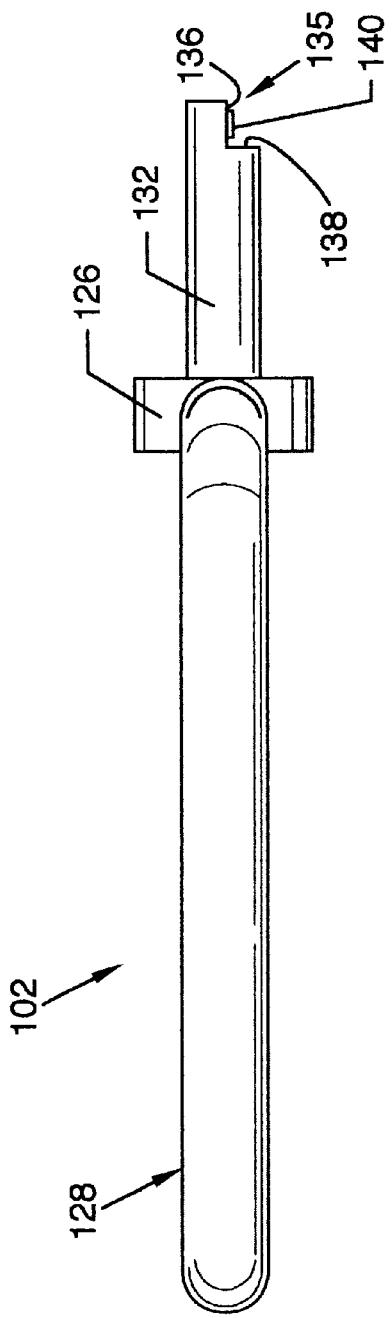
FIG. 19 illustrates a side view of the lift rod.

FIG. 19 illustrates a side view of the lift rod 102 where all numerals correspond to those elements previously described. A pivotal shaft 132 having a notched end 135 at one end extends perpendicular from the base member 126. The notched end 135 is formed by intersecting horizontal surface 136 and shaft member 128. A raised engagement member 140 extends downwardly from horizontal surface 136 for subsequent fractional engagement with the lift rod lever 104 as later described in detail.

Figure 20:
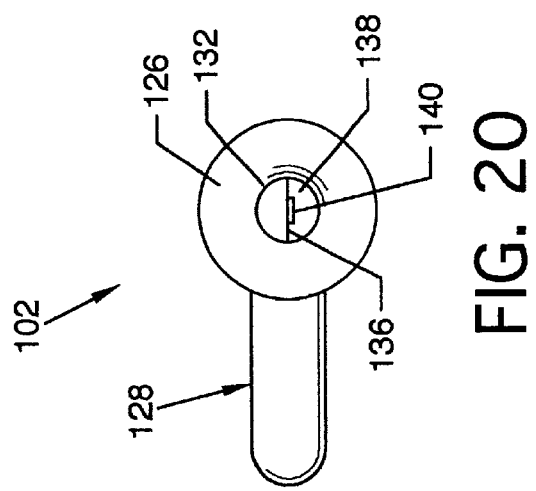
FIG. 20 illustrates an end view of the lift rod.

FIG. 20 illustrates an end view of the lift rod 102 where all numerals correspond to those elements previously described.

Figure 21:
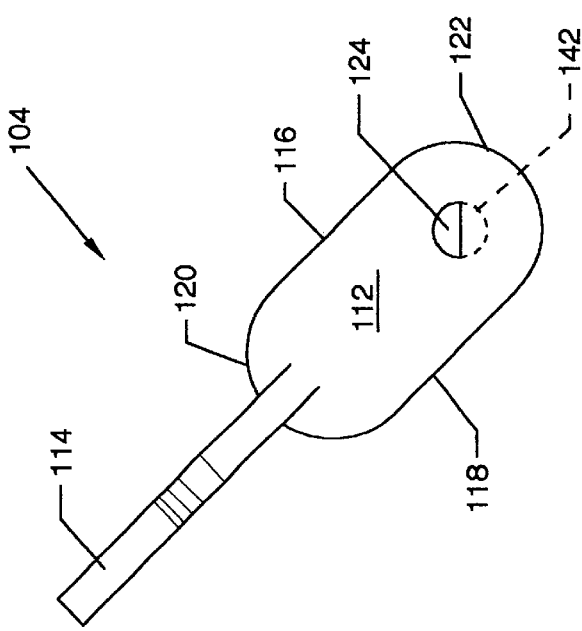
FIG. 21 illustrates a front view of the pivot rod lever.

FIG. 21 illustrates a front view of the lift rod lever 104 where all numerals correspond to those elements previously described. The semicircular hole 124 is the extension of a co-centered hole member 142 extending through the backside of the base member 112.

Figure 22:
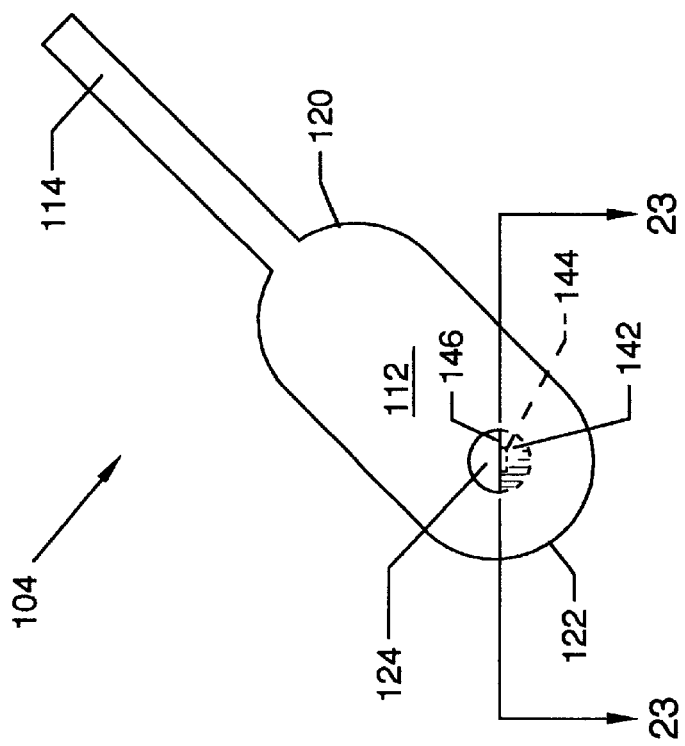
FIG. 22 illustrates a rear view of the pivot rod lever.

FIG. 22 illustrates a rear view of the lift rod lever 104 where all numerals correspond to those elements previously described. Illustrated in particular is the co-centered hole member 142 in alignment with the semicircular hole 124. A locking recess 144 is located in the flat surface 146 of the semicircular hole 124 for subsequent engagement with the raised engagement member 140 of the lift rod 102 when the lift rod 102 and the lift rod lever 104 are mated about the base member 100.

Figure 23:
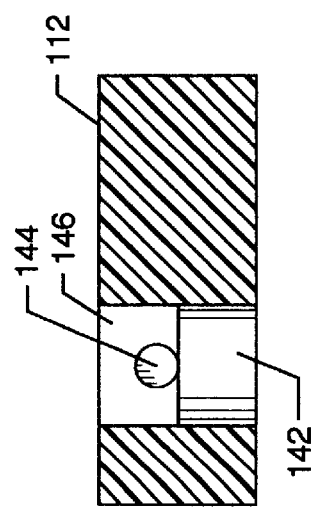
FIG. 23 illustrates a cross-sectional view along line 23—23 of FIG. 22.
Figure 24:
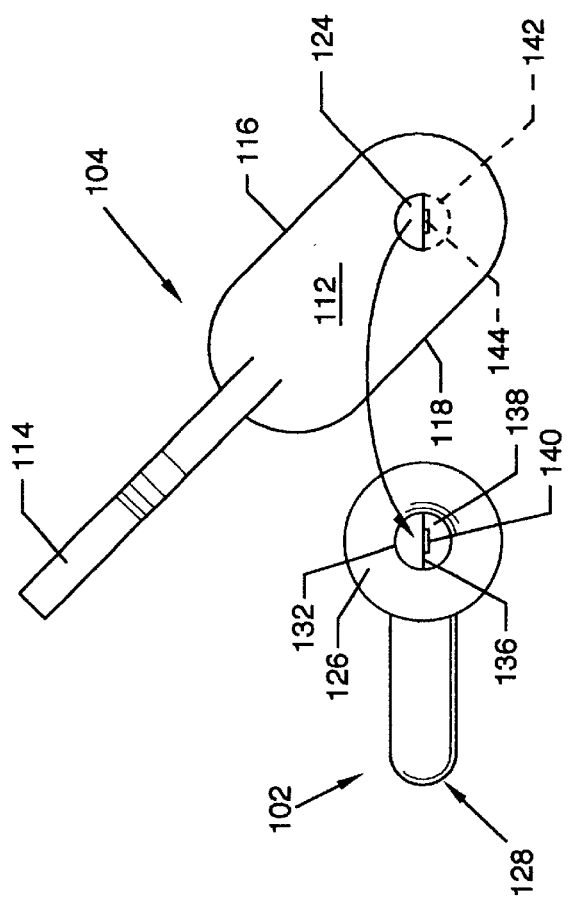
FIG. 24 illustrates the method of engagement of the lift rod lever with the lift rod.

FIG. 23 illustrates a cross-sectional view along line 23—23 of FIG. 22, illustrating the locking recess 144 located in the flat surface 146 of the semicircular hole 124 where all numerals correspond to those elements previously described.

MODE OF INSTALLATION AND OPERATION

The manner of installing and operating the mechanical handset lift 10 is now described. Installation begins by determining the requisite orientation of the mechanical handset lift 10 needed for proper operation with the particular size and type of telephone at hand. This is accomplished by placing the base unit 12 adjacent to the side of the telephone base 48 and positioning it so that the lift rod 26 carried by the base unit 12 is approximately flush with the bottom surface 50a of the central portion of the handset 50 and lies next to the handset receiver 54 in the proper position where when rotated it will be able to raise the handset receiver 54 off the hook-switch 56 to obtain a dial tone. Once one is satisfied that the requisite orientation has been established, one of a pair of matable hook and loop fastener strips of a fastening system such as is available under the registered trademark VELCRO is applied to the side of the telephone base 48, and the other of the pair is applied to the base unit 12. Then, the two fastener strips are pressed together to affix the base unit 12 to the side of the telephone base 48. If additional strength is needed, the angled mounting bracket 32 is employed. The angled mounting bracket 32 is fastened to the base unit 12 by placing vertical portion 34 of angled mounting bracket 32 against the base unit 12 and fastening it to the base unit 12 by thumbscrew 38 passing through the slot 36 in vertical portion 34 and threading into threaded hole 40 in base unit 12. The horizontal portion 42 of angled mounting bracket 32 extends under the telephone base 48. If more stability is still required, matable hook and loop fastener strips are attached to the bottom of the telephone base 48 and to the top surface of the horizontal portion 42 of the angled mounting bracket 32 and are pressed together to connect the telephone base 48 and the angled mounting bracket 32 positively to one another.

Once the mechanical handset lift 10 is securely attached to the telephone base 48 by following the installation procedure just described, it is ready for operation. When it is desired to obtain a dial limits for the positioning of the lift rod 102 for on and off hook operation of the handset.

Accordingly, the reader will see that the mechanical handset lift is of great benefit to the telephone handset operator. In addition, when the mechanical handset lift is used, it creates an environment that allows the telephone headset operator to use either the telephone handset or headset. Furthermore, the mechanical handset lift has the additional advantages in that: it provides a device that will mechanically pick up a telephone handset so that a dial tone may be obtained for the telephone headset in use; it provides a device that will allow its user to use either the telephone handset or telephone headset; it provides an environment on a persons desk which is less cluttered due to not having to have a telephone handset laying off to the side of the telephone, while the telephone headset is in use; and it provides a device that will mechanically pick up the handset in such a manner that will greatly increase the chances of not accidently hanging up the telephone while a telephone headset is in use.

The structure can be of acrylonitrile butadiene stytren (ABS) polymer or any other suitable polymer or material, and color coordinated to match a telephone. Height adjustment is also provided by the screw as in the previous embodiment or by the VELCRO as in the previous embodiment. Height of the lift is slightly over the center when lifted up by the rod which is dependent on the base unit height.

Although the description above contains many specificities, these should not be construed as limiting of the scope of the present invention, but as merely providing illustrations of some of the presently preferred embodiments of this invention. For example, the base unit, angled mounting bracket, lift rod, and lift rod lever can have other geometrical shapes, such as circular, oval, trapezoidal, triangular, etc.

Thus, the scope of the invention should be determined by the appended claims and their legal equivalents, rather than by the examples given.

I claim:

1. A handset lift for a telephone, comprising:
   a. a base unit for attachment to a telephone base, said base unit having a first side, a second side, and a hole extending therethrough from said first side to said second side;
   b. a lift rod, said lift rod being located on said first side of said base unit and being L-shaped with a short leg and a long leg joined together through an approximately 90-degree bend;
   c. a lift rod handle, said lift rod handle being located on said second side of said base unit and having a base portion and an actuation tab portion, said base portion lying along said second side of said base unit and said actuation tab portion extending upwardly from said base portion and above said base unit;
   d. a pivot shaft, said pivot shaft extending through said hole in said base unit and being connected to said short leg of said lift rod on said first side of said base unit and to said base portion of said lift rod handle on said second side of said base unit; and,
   e. whereby movement of said lift rod handle along an arc will cause said pivot shaft connected to said base portion of said lift rod handle to pivot and thereby cause said lift rod connected to said pivot shaft also to pivot.

2. The handset lift as defined in claim 1, wherein said base unit includes a main body portion and an ear-shaped extension member projecting upwardly from said main body portion, and wherein said hole through said base unit is located in said ear-shaped extension member.

3. The handset lift as defined in claim 2, wherein said main body portion is substantially square in shape and has two upper corners and two lower corners, and wherein said ear-shaped extension member is formed unitarily with said main body portion at one of said upper corners.

4. The handset lift as defined in claim 1, wherein a stop pin projects outwardly from said second side of said base unit adjacent to said lift rod handle for limiting pivotal movement of said lift rod handle.

5. The handset lift as defined in claim 4, wherein said base unit includes a main body portion and an ear-shaped extension member projecting upwardly from said main body portion, and wherein said hole through said base unit is located in said ear-shaped extension member and said stop pin is located on said ear-shaped extension member.

6. The handset lift as defined in claim 1, wherein two stop members project outwardly from said second side of said base unit on opposite sides of said lift rod handle to limit the movement of said lift rod handle in each of two directions.

7. The handset lift as defined in claim 6, wherein said base unit includes a main body portion and an ear-shaped extension member projecting upwardly from said main body portion, and wherein said hole through said base unit is located in said ear-shaped extension member and said two stop members are located on said ear-shaped extension member.

8. The handset lift as defined in claim 1, wherein said short leg of said lift rod includes a hole therein and wherein said connection of said pivot shaft to said short leg of said lift rod is formed by said pivot shaft frictionally engaging in said hole in said short leg.

9. The handset lift as defined in claim 1, wherein said connection of said pivot shaft to said short leg of said lift rod is formed by said pivot shaft and said short leg being integrally united with each other.

10. The handset lift as defined in claim 1, wherein said base portion of said lift rod handle includes a hole and wherein said connection of said pivot shaft to said base portion of said lift rod handle is formed by said pivot shaft frictionally engaging in said hole in said base portion of said lift rod handle.

11. The handset lift as defined in claim 10, wherein said hole in said base portion of said lift rod handle includes a semicircular hole portion and a co-centered circular hole portion, and wherein said pivot shaft includes a circular portion engaged within said co-centered circular hole portion and a notched end extending from said circular portion and engaged within said semicircular hole portion.

12. The handset lift as defined in claim 11, wherein said semicircular hole portion includes a locking recess, and wherein said notched end of said pivot shaft includes a raised engagement member frictionally engaged in said locking recess.

13. The handset lift as defined in claim 10, wherein said connection of said pivot shaft to said short leg of said lift rod is formed by said pivot shaft and said short leg being integrally united with each other.

14. The handset lift as defined in claim 1 and further comprising means for attaching said base unit to a telephone base.

15. The handset lift as defined in claim 14, wherein said means for attaching said base unit to a telephone base comprises a pair of matable hook and loop fastener strips one of which is affixed to said first side of said base unit and the other of which is for affixing to a lateral side of the telephone base.

16. The handset lift as defined in claim 15, wherein said means for attaching said base unit to a telephone base further comprises an angled mounting bracket having a vertical portion for bearing against said second side of said base unit and a horizontal portion for placement beneath the telephone base.

17. The handset lift as defined in claim 16, wherein said base unit has a threaded hole therein, said angled mounting bracket includes a slot in said vertical portion aligned with said threaded hole in said base unit, and a thumbscrew extends through said slot and is threaded into said threaded hole in said base unit, thereby coupling said angled mounting bracket to said base unit.

18. The handset lift as defined in claim 17, wherein said means for attaching said base unit to a telephone base further comprises a second pair of matable hook and loop fastener strips one of which is affixed to said horizontal portion of said angled mounting bracket and the other of which is for affixing to the bottom of the telephone base.

19. The handset lift as defined in claim 14, wherein said means for attaching said base unit to a telephone base comprises an angled mounting bracket having a vertical portion for bearing against said second side of said base unit and a horizontal portion for placement beneath the telephone base.

20. The combination of a telephone having a base with a spring biased hook-switch and a handset including a central portion for grasping by the hand, a receiver at one end of said central portion, and a microphone at an opposite end of said central portion, the receiver bearing against the hook-switch to maintain it in the off position, with a handset lift for lifting the receiver end of the handset off the hook-switch, said handset lift comprising:

a. a base unit positioned along a lateral side of said telephone base adjacent to said receiver and fastened to said telephone base, said base unit having a first side, a second side, and a hole extending therethrough from said first side to said second side;

b. a lift rod, said lift rod being located on said first side of said base unit and being L-shaped with a short leg and a long leg joined together through an approximately 90-degree bend, said long leg extending outwardly away from said first side of said base unit to a position beneath said central portion of said handset adjacent to said receiver;

c. a lift rod handle, said lift rod handle being located on said second side of said base unit and having a base portion and an actuation tab portion, said base portion lying along said second side of said base unit and said actuation tab portion extending upwardly from said base portion and above said base unit;

d. a pivot shaft, said pivot shaft extending through said hole in said base unit and being connected to said short leg of said lift rod on said first side of said base unit and to said base portion of said lift rod handle on said second side of said base unit; and, e. whereby movement of said lift rod handle along an arc will cause both said pivot shaft connected to said base portion of said lift rod handle and said lift rod connected to said pivot shaft to pivot and thereby cause said lift rod to engage said central portion of said handset near said receiver end and to pivot said handset about said microphone end and lift said receiver end off said hook-switch.

* * * * *